United States Patent Office 3,654,195
Patented Apr. 4, 1972

3,654,195
PROCESS FOR THE PREPARATION OF POLY-URETHANE FOAMS IN THE PRESENCE OF AN ORGANOPOLYSILOXANE COPOLYMER SURFACTANT
William J. Raleigh, Watervliet, N.Y., assignor to General Electric Company
No Drawing. Filed May 27, 1970, Ser. No. 41,067
Int. Cl. C08g 22/44
U.S. Cl. 260—2.5 AH        2 Claims

ABSTRACT OF THE DISCLOSURE

An organopolysiloxane copolymer of the formula, $$R^2(C_nH_{2n}O)_xR^3(R_2)SiO[R_2SiO]_a \rightarrow [RSiO[R'(C_nH_{2n}O)_xR^2]]_bR_2SiR_3(C_nH_{2n}O)_xR^2$$

wherein R, $R^2$ are lower monovalent hydrocarbon radicals, R' and $R^3$ are lower divalent hydrocarbon radicals, $a$ has a value of at least 4, $b$ has a value of at least 1, $n$ has a value of from 2 to 4 and $x$ has a value of at least 5.

BACKGROUND OF THE INVENTION

The present invention relates to organopolysiloxane copolymers and is pertinent to organopolysiloxane copolymers useful as surfactants in the formation of polyurethane foams.

Polyurethane foams are prepared by reacting certain complex polyols with various polyisocyanates such as aromatic diisocyanates and aromatic triisocyanates, in the presence of water. The water reacts with the isocyanate groups, resulting in the release of carbon dioxide, which acts as a foaming agent for the reaction mixture. Such polyurethane foams are formed by one of two general processes. In one of these processes, a prepolymer is formed by reacting some of the polyol with the polyisocyanate which is then further reacted with the remaining polyol and water in the presence of certain surface active agents to produce the desired foam. In the other process, the polyol, polyisocyanate and other reactants are added together in a single step to form the foam. The one step process suffers from a number of disadvantages over the two step process in that it is more difficult to obtain uniform cell density and uniform cell size as compared to the two step process. The reason for this is that most surface active agents are much more efficient in the two step process than the one step process. The one step process is desirable in industry in that urethane foams are produced at a much faster rate. Further, manufacturers of foam prefer surfactants or surface active agents that are soluble in the foam reactants in that a foam with better aesthetic properties is produced.

One object of the present invention is to provide a surface active agent that acts effectively in both the one step and two step urethane foaming processes.

It is another aim to provide a surface active agent that is soluble in the foam reactants used to produce polyurethane foams.

It is yet another aim to provide a surface active agent that produces polyurethane foam of uniform cell density and cell size.

These and other objects of my invention are more fully described in the following detailed description and in the appended claims.

SUMMARY OF THE INVENTION

In accordance with the present invention a new class of liquid organopolysiloxane copolymers is provided by the formulas:

$$R^2(C_nH_{2n}O)_xR^3(R_2)SiO[R_2SiO]_a \rightarrow [RSiO[R'(C_nH_{2n}O)_xR^2]]_bR_2SiR^3(C_nH_{2n}O)_xR^2$$

wherein R, $R^2$ are lower monovalent hydrocarbon radicals, R' and $R^3$ are lower divalent hydrocarbon radicals, $a$ has a value of at least 4, $b$ has a value of at least 1, $n$ has a value of from 2 to 4 and $x$ has a value of at least 5 and preferably from 5 to 100 or more. The value of $a+b$ preferably varies from 5 to 15 if the copolymer is to be soluble in the polyurethane foam reactants and the sum may vary from 5 to 60 to provide a surface active agent having good surfactant properties.

DESCRIPTION OF THE PREFERRED EMBODIMENT

The radicals R, $R^2$ are generally of not more than 16 carbon atoms and preferably not more than 10.

Among the radicals represented by R, $R^2$ are mononuclear and binuclear aryl, such as phenyl, naphthyl, benzyl, tolyl, xylyl, 2,6-di-t-butylphenyl, 4-butylphenyl, 2,4,6-trimethylphenyl, biphenyl and ethylphenyl; halogen-substituted mononuclear and binuclear aryl, such as 2,6-di-chlorophenyl, 4-bromophenyl, 2,5-di-fluorophenyl, 4,4'-dichlorobiphenyl, 2'-chloronaphthyl, 2,4,6-trichlorophenyl, and 2,5-dibromophenyl; nitro-substituted mononuclear and binuclear aryl, such as 4-nitrophenyl and 2,6-di-nitrophenyl; alkoxy-substituted mono and binuclear aryl, such as 4-methoxyphenyl, 2,6-dimethoxyphenyl, 4-t-butoxyphenyl, 2-ethoxyphenyl, 2-ethoxynaphthyl and 2,4,6-trimethoxyphenyl; alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologs and isomers of alkyl; alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologs and isomers of alkenyl; alkynyl such as propargyl, 2-butynyl and the various homologs and isomers of alkynyl; haloalkyl such as chloromethyl, iodomethyl, bromomethyl, fluoromethyl, chloroethyl, iodoethyl, bromoethyl, fluoroethyl, trichloromethyl, di-iodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 2,4-dichlorohexyl, 1,3 - dibromohexyl, 1,3,4 - trichlorohexyl, chloroheptyl, bromoheptyl, fluoroheptyl, 1,3-dichloroheptyl, 1,4,4-trichloroheptyl, 2,4-dichloromethylheptyl, chlorooctyl, bromooctyl, iodooctyl, 2,4-dichloromethylhexyl, 2,4 - dichlorooctyl, 2,4,4 - trichloromethylpentyl, 1,3,5-tribromooctyl and the various homologs and isomers of haloalkyl; haloalkenyl such as chlorovinyl, bromovinyl, chloroalkyl, bromoallyl, 3-chloro-n-butenyl-1,3-chloro-n-pentenyl-1, 3-fluoro-n-heptenyl-1, 1,3,3-trichloro-n-heptenyl-5, 1,3,5-trichloro-n-octenyl-6, 2,3,3-trichloromethylpentenyl-4 and the various homologs and isomers of haloalkenyl; haloalkynyl such as chloropropargyl, bromopropargyl and the various homologs and isomers of haloalkynyl; nitroalkyl such as nitromethyl, nitroethyl, nitro-n-propyl, nitro-n-butyl, nitropentyl, 1,3-dinitroheptyl and the homologs and isomers of nitroalkyl of not more than about 10 carbon atoms; nitroalkenyl such as nitroallyl, 3-nitro-n-butenyl-1, 3-nitro-n-heptenyl-1, and the various homologs and isomers of nitroalkenyl; nitroalkynyl such as nitropropargyl and the various homologs and isomers of nitroalkynyl; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxymethoxypentyl, butoxyhexyl, methoxyheptyl, ethoxyethoxy and the various homologs and isomers of alkoxyalkyl and polyalkoxyalkyl; alkoxyalkenyl and polyalkoxyalkenyl such as ethoxyvinyl, methoxyallyl, butoxyallyl, methoxy-n-butenyl - 1, butoxy-n-pentenyl - 1, methoxyethoxy-n-heptenyl-1, and the various homologs and isomers of alkoxyalkenyl and polyalkoxyalkenyl; alkoxyalkynyl and polyalkoxyalkynyl such as methoxypropargyl and the various homologs and isomers of alkoxyalkynyl and polyalkoxyalkynyl; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6-methylcyclohexyl, 2,5-di-methyl-cycloheptyl, 4-butylcyclopentyl, 3,4-dichlorocyclohexyl, 2,6 - dibromocycloheptyl, 6 - methoxycyclooctyl, 2 - nitrocyclopentyl, 1-cyclopentenyl, 3-methyl-1-cyclopentenyl, 5-methoxy-1-cyclopentenyl, 3,4 - dimethyl-1-cyclopentenyl, 2,5-dimethoxy-1-cyclopentenyl, 5-methyl-5-cyclopentenyl, 3,4-dichloro-5-cyclopentenyl, 5 - (tert-butyl)-1-cyclopentenyl, 2-nitro-1-cyclohexenyl, 1-cyclohexenyl, 3-methyl-1-cyclohexenyl, 3,4-dimethyl-1-cyclohexenyl and 6-methoxy-1-cyclohexenyl; and cyanoalkyl such as cyanomethyl, cyanoethyl, cyanobutyl and cyanoisobutyl.

In the same Formula 1, R' and R³ can be saturated and unsaturated divalent hydrocarbon radicals such as alkylene, which includes methylene, ethylene, propylene, butylene, pentylene, hexylene and the various homologs and isomers of alkylene; haloalkylene such as chloromethylene, chloroethylene and the various homologs and isomers of haloalkylene; mononuclear and binuclear arylene, such as phenylene, naphthylene, benzylene, tolylene; halogen-substituted mononuclear and binuclear arylene, such as 2,4-di-chlorophenylene, 4,4'-di-chlorobiphenylene, nitro-substituted mononuclear and binuclear arylene, such as 4-nitrophenylene and 2,6-di-nitrophenylene; alkoxy-substituted mono and binuclear arylene, such as 4-methoxy-phenylene, 2,6-dimethoxy-phenylene; alkenylene or substituted alkylene such as butyleneylene; alkynylene such as ethynylene; haloalkenylene such as chloropropylenylene, iodopropylenylene; nitroalkenylene such as nitroethylenylene, nitro-n-propylenylene, nitro-n-butylenylene, nitropentylenylene; alkoxyalkylene and polyalkoxyalkylene such as methoxymethylene, ethoxymethylene, methoxyethylene, ethoxyethylene, ethoxyethoxyethylene, butoxymethoxyethylene; alkoxyalkenylene and polyalkoxyalkenylene such as methoxypropylenylene; cycloalkylene and alkyl, halogen, alkoxy and nitro-substituted cycloalkylene, and cycloalkenylene such as cyclopentylene, cyclohexylene, 6-methylcyclohexylene; cyanoalkylene such as cyanomethylene, cyanoethylene, cyanobutylene and cyanoisobutylene; carboxy-substituted alkyl or alkylene such as carboxymethyl or carboxymethylene, carboxyethyl, carboxypropyl, carboxybutyl; oxyalkenylene and oxyalkylene, oxyalkynylene; and carbamyl-substituted alkyl or alkylene such as carbamylmethyl or carbamylmethylene, carbamylethyl, carbamylpropyl, carbamylbutyl.

The above substituent radicals for R' and R³ may generally have up to 16 carbon atoms and preferably up to 10 carbon atoms and include the various homologs and isomers of the radicals that have been identified above.

The sum of $a+b$ in Formula 1 is preferably 5 to 15 for polymers that are soluble in urethane foam reactants. However, good surface active agents are obtained when the sum of $a+b$ varies from 5 to 60.

The organosilane compounds of Formula 1 can be prepared by the simple esterification of a liquid carboxy-alkyl and alkylene-containing organopolysiloxanes having the formula:

(2)     $HR^3(R_2)SiO[R_2SiO]_a[RSiO[R'H]]_bR_2SiR^3H$ with a liquid polyalkylene glycol monomer having the formula:

(3)          $HO(C_nH_{2n}O)_xR^2$ wherein R' and R³ are alkylene carboxy radicals as previously defined of preferably not more than 10 carbon atoms and R, R², $a$, $b$, $n$ and $x$ are as previously defined.

The carboxy-alkyl and alkylene-containing organopolysiloxane of Formula 2 can readily be formed by the hydrolysis and condensation of a diorganodichlorosilane of the formula:

(4)          $R_2SiCl_2$ with a cyanoalkyldiorganochlorosilane having the formula:

(5)          $R_2SiClR^5CN$ where R is as previously defined and R⁵ is an arylene or alkylene radical preferably having not more than 10 carbon atoms as previously defined for the R', R³ radicals and such that $R^5CO_2$ is equivalent to R³.

During the hydrolysis and condensation of the reactants of Formulas 4 and 5, the various silicon-bonded chlorine atoms are replaced by silicon-bonded hydroxyl groups which intercondense to form siloxane linkages and the nitrile radical hydrolyzes to form a carboxyl radical.

The cyanoalkyldiorganochlorosilanes of Formula 5 are prepared by effecting reaction between a diorganochlorosilane having the formula:

(6)          $R_2SiHCl$ where R is as previously defined and either acylonitrile, methacylonitrile or allyl cyanide in the presence of a suitable catalyst. Illustrative of the diorganosilanes within the range of Formula 6 are dimethylchlorosilane, methylphenylchlorosilane, diphenylchlorosilane and diphenylchlorosilane. Products within the scope of Formula 5 which can be prepared by reacting a diorganochlorosilane of Formula 6 with acrylonitrile, methacrylonitrile or allyl cyanide include for example, dimethyl-beta-cyanoethylchlorosilane, methylphenyl - beta-cyanoethylchlorosilane, diphenyl - gamma-cyanopropylchlorosilane, and methyl-cyclohexyl-beta-cyanopropylchlorosilane. The cyanoalkyl-diorganochlorosilanes of Formula 5 are characterized by the fact that the nitrile group is attached to a carbon atom which is at least one carbon atom removed from the silicon.

Illustrative of the diorganodichlorosilane within the scope of Formula 4 which are hydrolyzed and condensed with the diorganocyanoalkylchlorosilane of Formula 5 are dimethyldichlorosilane, methylphenyldichlorosilane, diphenyldichlorosilane, methylethyldichlorosilane, methylcyclohexyldichlorosilane and methylvinyldichlorosilane.

The diorganodichlorosilane of Formula 4 is mixed with diorganocyanoalkylchlorosilane in the proper proportion and the mixture is added slowly to water with stirring so as to form a uniform mixture of the organochlorosilanes and water to facilitate the hydrolysis and condensation of the silicon-bonded chlorine atoms and the hydrolysis of the nitrile groups to carboxyl groups. In general the amount of water employed in the hydrolysis and condensation is sufficient to hydrolyze all of the silicon-bonded chlorine atoms and sufficient to provide a solvent for the hydrogen chloride which results from the hydrolysis. Preferably, the amount of water is maintained at a low value so as to provide a concentrated hydrogen chloride solution or even to be insufficient to dissolve all of the hydrolysis chloride. Where the amount of water is insufficient to dissolve the hydrogen chloride generated, it is desirable to maintain the reaction mixture under pressure, such as a pressure of about 50 pounds per square inch. The amount of water employed is from about 0.75 to 1.25 parts by weight per part of the mixture of the organochlorosilanes of Formulas 4 and 5. The hydrolysis and condensation reaction is exothermic and the temperature increases to a maximum of about 70° C. during the course of the hydrolysis and condensation which takes place in about 1 to 6 hours.

After completion of this hydrolysis and condensation reaction, water and hydrogen chloride are stripped to yield a reaction mixture containing a precipitate of ammonium chloride from the hydrolysis of the nitrile group to the carboxyl group. The precipitate is filtered and the reaction mixture is then dried. In order to insure a uniform composition, the dried and filtered hydrolyzate is equilibrated with sulfuric acid. In general, satisfactory results are obtained by adding from about 1 to 5 percent by weight of 86% sulfuric acid to the hydrolyzate and heating the reaction mixture at a temperature in the range of 75° C. to 125° C. for about 1 to 3 hours. At the end of this time the reaction mixture is cooled to room temperature and washed with water to yield a product of the formula:

(7)
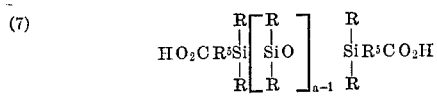

wherein $R^5$ and R are as defined previously.

The compound of Formula 7 is then reacted with the cyclic compound of the formula:

(8) $\quad (R_2SiO)_4$ and the cyclic compound of the formula:

(9) $\quad (HO_2CR^6RSiO)_4$ where R is as defined previously and $R^6$ represents alkylene and arylene radicals as described previously with reference to R' wherein $R^6CO_2$ is equivalent to R'.

The compounds of Formulas 8 and 9 are added to the compound of Formula 7 in the mole ratio of 1 mole of Formula 8 to 1 mole of Formula 9 to 4 moles of Formula 7 to provide the polymer of Formula 2. The compound of Formula 2 is obtained by equilibrating in sulfuric acid the compounds of Formulas 8 and 9 with the polymer of Formula 7. Generally 0.1 to 0.5 part of sulfuric acid is added per part of the polymer. In the resulting reaction mixture the bonds of cyclic compounds of Formulas 8 and 9 are broken. The addition reaction of these compounds to the polymer of Formula 7 is exothermic. However, additional heat is added to the reaction mixture to maintain the reaction mixture at a temperature generally in the range of 80–150° C. and preferably at 100–120° C. During the reaction the mixture is thoroughly agitated with a stirrer and the reaction is allowed to proceed for 1–6 hours and preferably 2–4 hours at the above temperature. When the reaction is completed the reaction mixture is neutralized with $NaHCO_3$. Water is then added so as to form an organic phase and an aqueous phase. The organic phase is then separated from the water phase and water is once more added to the organic phase to wash it free of impurities soluble in the aqueous phase. The water phase is then separated from the organic phase to leave the organic phase free of water soluble impurities. Any other remaining impurities are then separated out by filtering the organic phase to obtain a pure product of Formula 2.

The organopolysiloxane copolymer of Formula 1 is then formed by the esterification of the organopolysiloxane of Formula 1 with the polyethylene glycol monoether of Formula 3.

The polyethylene glycol monoethers are formed by reacting a monohydric alcohol of the formula R"OH with an alkylene oxide or a mixture of alkylene oxides. By controlling the reaction conditions during the reaction between the aforementioned monohydric alcohol and the alkylene oxide, the molecular weight of the polyalkylene glycol monoethers can be controlled. While any polyalkylene glycol monoether within the scope of Formula 3 can be used in the the practice of the present invention, it is preferred that the material contain at least 5 oxyalkyene units and preferably that x in Formula 3 vary from 5 to 100. In order to be most effective in the preparation of polyurethane foams, it is preferred that the polyethylene glycol monoether have a molecular weight of from about 300 to 5,000.

The polyalkylene glycol monoethers employed in the practice of the present invention contain oxyalkylene groups of from 2 to 4 carbon atoms. Included within these oxyalkylene groups are oxyethylene, oxypropylene-1,2-oxypropylene-1,3, oxybutylene-1,2, etc. The monoethers of Formula 3 can contain a number of oxyalkylene groups which are identical to each other or the oxyalkylene groups can comprise a mixture of various types of oxyalkylene groups. In the preferred embodiment of the invention, the oxyalkylene groups are oxyethylene. Many of these polyethylene glycol monoethers employed in the practice of the present invention are described in U.S. Patents 2,425,755 and 2,448,644.

In preparing the organopolysiloxane copolymer of Formula 1, any conventional means of esterification can be used. Preferably three molecules of the polyalkylene glycol monoether of Formula 3 is reacted with one molecule of the organopolysiloxane of Formula 2 to produce the copolymer of Formula 1. By controlling the particular carboxyalkyl-containing organopolysiloxane of Formula 2 and the particular polyalkylene glycol monoether of Formula 3, the relative proportions of the silicon portion and polyoxyalkylene portion of the copolymer of Formula 1 are controlled. Preferably the silicone portion of the copolymer comprises 78–82% mole percent of the total molecular weight of the copolymer. The proportion of the silicone portion of the molecule to the polyalkylene glycol monoether portion is quite important in producing a good surface active agent. It was found that when the copolymers have the above stated mole percent of this silicone portion of the molecule an efficient surface active agent is obtained.

In one acceptable method of forming the copolymers of Formula 1, the organopolysiloxane of Formula 2 and the polyalkylene glycol monoether of Formula 3 are mixed together in the presence of a suitable inert solvent and a catalyst and heated at the reflux temperature of the catalyst until esterification is effected. Suitable solvents include the hydrocarbon solevnts such as benzene, toluene, xylene, and mineral spirits. The amount of solvent employed is not critical and may vary within wide limits. Satisfactory results have been obtained by using from about 0.5 to 5 parts of solvent per part of the mixture of the polysiloxane of Formula 2 and the monoether of Formula 3. One extremely useful catalyst for the esterification reaction is p-toluene sulfonic acid. The amount of catalyst being employed is not critical, with satisfactory results being obtained using from 0.1 to 5 percent by weight of the catalyst based on the weight of the reaction mixture. The reaction usually takes about 2 to 24 hours before esterification is completed. After esterification is completed, the catalyst is neutralized with sodium bicarbonate and the solution is then filtered to remove impurities. The solvent is distilled from the reaction mixture to leave a copolymer within the scope of Formula 1 which is a clear, low viscosity fluid.

In another method for forming the compound of Formula 1, the polyethylene glycol monoether of Formula 3 is reacted in the presence of a catalyst and in a solvent with a compound of the formulas:

(10) $\quad\quad\quad\quad R^7NCO$ or

(11) $\quad\quad\quad\quad R^7OH$ wherein $R^7$ is an unsaturated single hydrocarbon radical. The radical $R^7$ may be selected from alkenyl; alkynyl; halogen-substituted alkenyl, and alkynyls; nitroalkenyl; nitroalkynyl; alkoxyalkenyl and polyalkoxyalkenyl; alkoxyalkynyl and polyalkoxyalkynyl; and cycloalkenyl and alkyl, halogen, alkoxy and nitro-substituted cycloalkenyl. The radicals which $R^7$ represents generally have not more than 16 carbon atoms and preferably not more than 10 carbon atoms.

The compounds of Formulas 10 and 11 are reacted with the monoethers of Formula 3 in a solvent such as benzene, toluene, etc. The amount of solvent is not critical and is preferably 0.5 to 4 parts of the reaction mixture. In order for the reaction to proceed efficiently there is also present a catalyst which is an acid catalyst such as paratoluene sulfonic acid when the compound of Formula 11 is reacted and a tin catalyst such as tin octoate when the compound of Formula 10 is reacted. The tin octoate catalyst is utilized in 0.001 to 0.1 part of catalyst per part of the reaction mixture. The acid catalyst is utilized in 0.01 to 1 part of acid per part of the reaction mixture. The reaction is generally carried out in a temperature range of 50 to 150° C. and preferably at a temperature range of 90 to 100° C. in 1 to 3 hours. After the reaction has proceeded to completion the catalyst is filtered out of the reaction mixture and the solvent is distilled off to produce a product having the formula:

(12)
$$R'^7NCO(OC_nH_{2n})_xR^2$$

or

(13) $\quad R^7O(OC_nH_{2n})_xR^2$ wherein $R^7$ and $R^2$ are as defined previously.

The products of Formulas 12 and 13 are then reacted with a polysiloxane of the formula:

(14) $\quad HR_2SiO(R_2SiO)_a(RHSiO)_bR_2SiH$ in an addition reaction to form the copolymer of Formula 1. The polysiloxane of Formula 14 is formed by reacting a mixture of cyclic organosiloxanes of the formula:

(15) $\quad (R_2SiO)_w$ and a cyclic hydroorganosiloxane of the formula:

(16) $\quad (RHSiO)_v$ with a diorganodisiloxane of the formula:

(17) $\quad R_2SiOSiR_2$ wherein R is as previously defined and $w$ and $v$ are 3 or 4.

The compounds of Formulas 15, 16 and 17 are mixed in a molar proportion of 9 moles of the compound of Formula 15 with 1 mole of the compound of Formula 16 with 1 mole of compound of Formula 17 to react to produce a polymer of Formula 14. These compounds are equilibrated in the presence of an acid catalyst such as $H_2SO_4$. Thus, preferably 1–5 parts by weight $H_2SO_4$ is added per part by weight of the reaction mixtures. Although the reaction mixture may be heated to 60–80° C. to allow the equilibration reaction to proceed at a rapid rate, the reaction may also take place at room temperature. The reaction mixture is constantly agitated with a mechanical agitator and the reaction is allowed to proceed for 10–20 hours. When the reaction has reached completion the acid in the reaction mixture is neutralized with $NaHCO_3$. The resulting neutralized reaction mixture is washed with water and the organo phase is separated out from the water phase. Any remaining impurities in the organo phase are then filtered out to yield a pure product of the Formula 14.

The polymer of Formula 14 is then reacted in an SiH olefinic addition reaction with the unsaturated alkenyl carboxyl alkylene glycol monoether of Formula 12 or with the alkenyl oxyalkylene glycol of Formula 13 to produce the product of Formula 1. In one suitable method the reactants are mixed together in the presence of a suitable solvent and a catalyst and heated at an elevated temperature until the addition reaction is completed. Suitable inert solvents that may be used are hydrocarbon solvents such as benzene, toluene, xylene, and mineral spirits. Almost 0.5 to 5 parts of solvent are used per part of the compounds taking part in the addition reaction. Suitable catalysts for the addition reaction are generally metal organic compounds such as tin hexoate and particularly tin octoate. The amount of the catalyst employed is not critical with satisfactory results being obtained with 0.1 to 10 percent by weight of the catalyst based on the weight of the reaction mixture. The reaction is continued until the SiH addition is completed which usually takes from about 1 to 12 hours. After the addition reaction is completed the catalyst is separated out by filtration and the solvent is distilled from the reaction mixture to leave a copolymer within the scope of Formula 1 which is a clear, low viscosity fluid. In forming the product of Formula 1 three moles of the compounds of Formulas 12 or 13 are reacted with one mole of the polymer of Formula 14.

In using the organopolysiloxanes of the present invention as additives in the production of polyurethane foams, the organopolysiloxane of Formula 1 is added to the other ingredients of the polyurethane foam reaction mixture in proportions as described below. The polyurethane foam reaction mixture comprises three essential ingredients, namely, a polyisocyanate, a polyol and water.

The polyisocyanates which are useful in the practice of the present invention are those well known polyisocyanates which are conventionally used in the manufacture of polyurethane foams. Generally speaking, these polyisocyanates contain at least 2 isocyanate groups per molecule, which are separated from each other by at least 3 carbon atoms, i.e., isocyanate groups are not on adjacent carbon atoms in the formulation. These polyisocyanates may be aromatic or aliphatic and can be characterized by the formula:

(8) $\quad Y(N=C=O)_c$ where Y represents a polyvalent organic radical having a valence $c$ and where $c$ has a valve of at least 2, and preferably from 2 to 3, inclusive. The numbers of isocyanate groups is, of course, equal to the numbers of free valences in the radical Y. In general, the radical Y consists preferably of carbon and hydrogen atoms only, but may also include oxygen atoms. Preferably, also, the radical Y is a mononuclear aromatic radical. Illustrative of the various polyisocyanates which can be employed in the practice of the present invention can be mentioned, for example, 2,4-toluene diisocyanate; m-phenylene diisocyanate; methylene-bis-(4-phenylisocyanate); 4-methoxy-m-phenylene diisocyanate; 1,6-hexamethylene diisocyanate; 2,4,6-toluene triisocyanate; 2,4,4'-diphenylether triisocyanate; 2,6-toluene diisocyanate; 3,3'-bitolylene-4,4'-diisocyanate; diphenylmethane-4,4'-diisocyanate; 3,3'-dimethyldiphenylmethane-4,4'-diisocyanate; triphenylmethane triisocyanate; dianisidine diisocyanate, etc. In addition to using only a single isocyanate in the production of polyurethane foams, it is also contemplated that mixtures of various isocyanates can be employed. In fact, the preferred isocyanate material employed in the practice of the present invention is a mixture of 80% by weight of 2,4-toluene diisocyanate and 20% by weight of 2,6-toluene diisocyanate.

The polyols employed in the practice of the present invention are those polyols conventionally used in the manufacture of polyurethane foam products. Chemically, these materials fall into one of two general categories. The first is the hydroxy-containing polyester and the second is the hydroxy-containing polyether. The polyesters are conventionally formed by the reaction of a polyhydric alcohol with a dibasic acid. The polyhydric alcohol is employed in excess so that the resulting material contains free hydroxyl groups. Illustrative of the types of polyester polyol materials employed in the production of polyurethane foams are polyesters formed by the reaction between dibacis acids, such as adipic acid, with polyhydric alcohols such as ethylene glycol, glycerine, pentaerythritol, sorbitol and the like. In general, these polyester polyols are prepared so as to contain from 2 to about 6 hydroxyl groups per molecule.

The polyether polyols employed in the practice of the present invention for the manufacture of urethane foams can be subdivided into two types, the first of which is a polyalkylene glycol such as polyethylene glycol or polypropylene glycol or mixed polyethylene-polypropylene glycol. The second type is a polyoxyalkylene derivative of a polyhydric alcohol such as polyoxyalkylene derivatives of glycerine, a trimethylolethane, a trimethylolpropane, neopentyl glycol, sorbitol, etc. These materials are well known in the art and are prepared by effecting reaction between an alkylene oxide or a mixture of alkylene oxides and the polyhydric alcohol. One common type of material is prepared by reacting 1,2-propylene oxide with glycerine to form a triol containing 3 polyoxypropylene groups attached to the glycerine nucleus.

These polyester polyols and polyether polyols are characterized by molecular weights of the order of from about 350 up to 10,000 or more. The particular type of triol and its molecular weight are generally determined by the characteristics of the urethane foam and the economics involved. In general, either the polyester polyols or the polyether polyols can be used interchangably in the manufacture of either rigid polyurethane foams, semi-rigid polyurethane foams or flexible polyurethane foams. The distinguishing characteristic of the materials which control the type of foam in which they are to be used is the molecular weight. In general, the polyol used in the formation of rigid foams has a molecular weight in the range of from about 350 to 600. Generally, these polyols are triols or higher polyols. For the manufacture of semi-rigid foams, the polyol has a molecular weight in the range of from about 600 to 2500 and is generally a triol. For the manufacture of flexible foams, the polyol has a molecular weight of the range from about 2500 up to about 10,000 and is a triol or a mixture of a triol and a diol.

While the polyisocyanate and the polyol are the essential ingredients in the polyurethane foam reaction mixture, these reaction mixtures often contain a number of other ingredients in minor proportions. One of the most common of these other ingredients is water. Water reacts with the isocyanate groups and results in the liberation of carbon dioxide which serves as a blowing agent. However, it is often impossible to form low density foams using the carbon dioxide generated in situ as the only blowing agent, since the generation of carbon dioxide also results in cross-linking of the foam. Sometimes excessive cross-linking will occur if sufficient water is added to the reaction mixture to generate the desired amount of carbon dioxide. Other times, because of the particular polyol and isocyanate employed in the reaction mixture, it is not desirable to employ any water, since any water induced generation of cross-linking will result in a foam which is too brittle.

Accordingly, in those cases where it is not desirable to add any water, or in those cases where it is not feasible to add the amount of water desired, the reaction mixture often includes a separate blowing agent, such as a low boiling inert liquid. The ideal liquid is one which has a boiling point slightly above room temperature, i.e., a temperature of about 20 to 25° C., so that the heat generated by the exothermic reaction between the hydroxyl groups and the isocyanate groups will warm the reaction mixture to a temperature above the boiling point of the liquid blowing agent and cause it to boil. Suitable blowing agents include alkanes having appropriate boiling points, but the most desirable blowing agent has been found to be trichlorofluoromethane, which is commercially available under the trade name Freon 11.

Other ingredients often found in polyurethane foam reaction mixtures are various catalysts. For example, it is often desirable to add a catalyst to facilitate the reaction between water present in the reaction mixture and isocyanate groups. A typical type of catalyst for this reaction is a tertiary amine catalyst. These amine catalysts are well known in the art, and include materials such as N - methylmorpholine, dimethylethanolamine, triethylamine, N,N'-diethylcyclohexylamine, dimethylhexadecylamine, dimethyloctadecylamine, dimethylcocamine, dimethylsilylamine, N-cocomorpholine, triethylene diamine, etc.

To catalyze the reaction between the hydroxyl groups of the polyol and the isocyanate, polyurethane foam reaction mixtures often contain a catalyst comprising a metal salt of an organic carboxylic acid. Most often this curing agent is a tin salt such as tin stearate, dibutyl tin dilaurate, tin oleate, tin octoate, etc.

The properties of the various components of the polyurethane foam reaction mixture may vary within wide limits as is well known in the art. When water is added to the reaction mixture, it is present in an amount sufficient to generate the amount of carbon dioxide desired. Generally, when water is employed it is present in an amount up to about 5 parts per 100 parts, by weight, of the polyol. The polyisocyanate is generally present in an excess over the amount theoretically required to react with both the hydroxyl groups of the polyol and any water present in the reaction mixture. Generally, the polyisocyanate is present in an excess equal to about 1 to 15 percent, by weight. When a tertiary amine catalyst is present in the reaction mixture, it is generally employed in an amount equal to from about 0.001 to 3.0 parts per 100 parts, by weight, of the polyol. When a metal salt curing agent is present, it is generally employed in an amount equal to from about 0.1 to 1.0 part per 100 parts, by weight, of the polyol. When a separate blowing agent is employed, it is generally employed in an amount equal to from about 5 to 25 parts per 100 parts, by weight, of the polyol.

When employing the organopolysiloxane copolymer of Formula 1 as an aid in the formation of polyurethane foams, the copolymer is generally present in an amount equal to from about 0.25 to 7.5 parts by weight based on 100 parts by weight of the polyol in the reaction mixture.

Polyurethane foams can be prepared by one of two general methods employing the organopolysiloxane copolymer of Formula 1. In the first, and preferred process, all of the reactants are rapidly mixed together and the reaction mixture is allowed to foam. After foaming has been completed, the resulting foam can be cured, if desired, by heating at elevated temperatures, e.g., a temperature of from about 75 to 125° C. for several hours. Alternatively, the foam may be stored at room temperature until complete cure has been effected in times of from 24 hours to 48 hours or more.

In one modification of the second process, a prepolymer is formed from the polyol and the polyisocyanate to give a prepolymer containing excess polyisocyanates. This prepolymer is then mixed with the other reactants such as water, tertiary amine catalyst, blowing agent, curing catalyst and polysiloxane copolymer and allowed to foam.

In another modification of the second process, the polyisocyanate and a portion of the polyol are reacted together to form a base resin. When foaming is desired, the remainder of the polyol as well as the other ingredients of the reaction mixture are added to the base resin and the mixture is stirred and allowed to foam. Again, curing can be effected at room temperature or at an elevated temperature.

Regardless of the foaming process in which the organopolysiloxane copolymer of Formula 1 is employed, and regardless of whether the components of the reaction mixture are such as to produce rigid foams, semi-rigid foams or flexible foams, the use of these organopolysiloxane copolymers results in foams having smaller and more uniform cell sizes than corresponding foams prepared from prior art materials.

Because of the complexity of the well known technology surrounding the manufacture of polyurethane foams of all types, no attempt will be made here to discuss the many variations in technique and formulations which can be employed. For further details on the technology of polyurethane foams, reference is made to the voluminous patent and technical literature on the subject, including Patent 2,901,445—Harris; "Polyurethanes," Bernard A. Dombrow, Reinhold Publishing Corporation, New York (1957); "Polyurethanes, a Versatile Synthetic for a Dynamic Area," Polyurethane Associates (1956); "Uurethane Applications Laboratory Memorandum No. 60," Apr. 28, 1961 by Wyandotte Chemicals Corporation, Research Division; "Polyurethane Foam Catalysts," Technical Bulletin No. B6–R4, June 1960, Armour Industrial Chemical Company; "Dabco," Data Bulletin No. 4, July 20, 1959, Hourdy Process Corporation.

The following examples are illustrative of the practice of the invention and are not intended for purposes of limitation. All parts are by weight. The primary allyl carbamate of the polyether alcohol of the examples was prepared by reacting allylisocyanate with a polyether alcohol in the presence of a tin octolate catalyst and 0.5 part of toluene solvent per part of the reaction mixture. After the reaction had proceeded for 2 hours at a temperature of 95° C., the catalyst was filtered off and the solvent was distilled off to yield the polyether alcohol product.

Example 1

Using a 5 liter three-necked flask to contain the reaction mixture, there was introduced into the flask 269 parts of a compound of the formula:

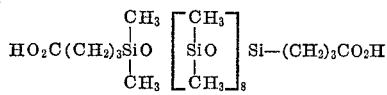

222 parts of octamethylcyclotetrasiloxane and 396 parts of carboxyethylmethylcyclotetrasiloxane. The flask had an agitator, thermometer and condenser for refluxing the reaction mixture. To the reaction mixture there was added a catalyst of 99.0 parts of 86% $H_2SO_4$ and the entire mixture was heated at 100° C. After the reaction had proceeded for three hours the temperature was lowerd and $NaHCO_3$ was added to the mixture to neutralize the acid. The organic phase was separated from the aqueous phase, washed with water and then separated again from the aqueous phase. The organic phase was then filtered to remove impurities and yield a product of the formula:

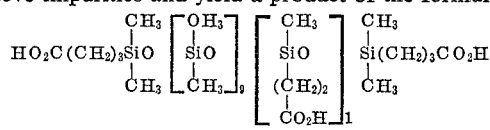

Some of the properties of this compound are:
Viscosity at 77° F.—175 ctsk.
Weak acid number—153

This product was then added to a primary polyether alcohol of molecular weight 550 in the presence of toluene as the solvent and paratoluene sulfonic acid as the catalyst. The esterification proceeded for about 10 hours at 100° C. and then the reaction mixture was washed and neutralized with $NaHCO_3$. The aqueous phase was repeated from the neutralized reaction mixture and the remaining organic phase was filtered to yield a product within Formula 1 having the structure:

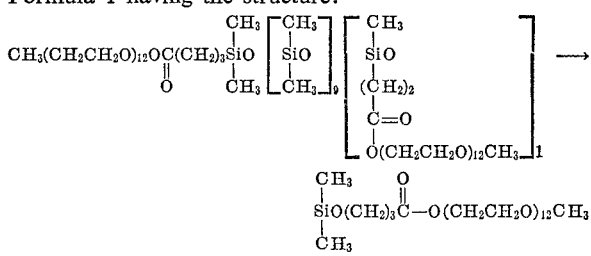

Example 2

There was introduced into a 2 liter three-necked flask 666 parts of octamethylcyclotetrasiloxane, 60 parts of methylhydrogencyclotetrasiloxane and 134 parts of tetramethyldisiloxane. The reaction mixture was then equilibrated by adding to it 26 parts of 86% by weight $H_2SO_4$.

The flask was fitted with an agitator, thermometer and condenser so that the reaction mixture would be constantly agitated and refluxed. The reactants were constantly agitated at a temperature of 25° C. for 15 hours. After this time period had passed the acid in the reaction mixture was neutralized with $NaHCO_3$ and the aqueous phase that formed was separated from the organic phase. The organic phase was washed with water and again the aqueous phase was separated from the organic phase. The organic phase was then filtered to remove any remaining impurities to produce a product having the formula:

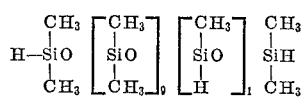

This compound had the following properties:
Viscosity at 77° F.—5.9 ctsk.
Percent H (by weight)—0.34

One mole of the above compound was then mixed with 3 moles of a primary allyl carbamate of a polyether alcohol in the presence of the solvent, toluene, where there was present 0.5 part of solvent per part of the reactants. There was also present 0.001 part of complexed platinum which acted as the catalyst in the addition reaction. After the reaction had proceeded at a temperature of 100° C. for 4 hours the temperature was lowered and the solvent was distilled off. There was then left a product within the scope of Formula 1 having the formula:

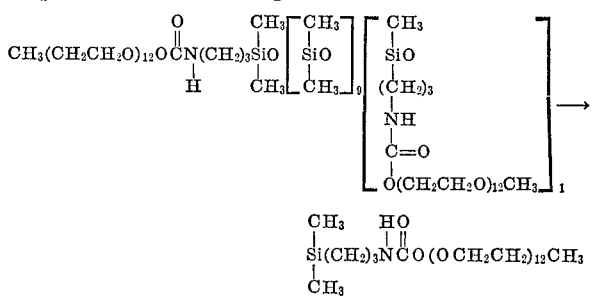

What is claimed is:
1. A process for forming polyurethane foams of improved properties which comprises effecting reaction between a polyisocyanate and a polyol in the presence of an organopolysiloxane copolymer having the formula:

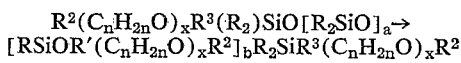

wherein R and $R^2$ are lower monovalent hydrocarbon radicals of not more than 10 carbon atoms, R' and $R^3$ are divalent hydrocarbon radical, $a$ has a value of at least 4, $b$ has a value of at least 1, the sum of $a+b$ varies from 5 to 60, $n$ has a value of from 2 to 4 and $x$ has a value of at least 5 and in the presence of a blowing agent.

2. The process of claim 1 wherein the polyol is derived from a polyhydric alcohol and an alkylene oxide containing from 2 to 4 carbon atoms and the sum of $a+b$ varies from 5 to 15.

References Cited
UNITED STATES PATENTS

| | | | |
|---|---|---|---|
| 3,272,762 | 9/1966 | Ibbotson et al. | 260—2.5 |
| 3,541,127 | 11/1970 | Beattie et al. | 260—2.5 |
| 3,509,192 | 8/1970 | Niederprum et al. | 260—2.5 |

FOREIGN PATENTS

| | | | |
|---|---|---|---|
| 2,098 | 2/1964 | Japan | 260—2.5 |

DONALD E. CZAJA, Primary Examiner

E. C. RZUCIDLO, Assistant Examiner

U.S. Cl. X.R.

260—448.2 R